(12) United States Patent
Bahar

(10) Patent No.: US 10,189,626 B2
(45) Date of Patent: Jan. 29, 2019

(54) PACKAGE HANDLING SYSTEM

(71) Applicant: Reuben Bahar, Encino, CA (US)

(72) Inventor: Reuben Bahar, Encino, CA (US)

( * ) Notice: Subject to any disclaimer, the term of this patent is extended or adjusted under 35 U.S.C. 154(b) by 0 days.

(21) Appl. No.: 15/842,079

(22) Filed: Dec. 14, 2017

(65) Prior Publication Data

US 2018/0339829 A1 Nov. 29, 2018

Related U.S. Application Data

(60) Provisional application No. 62/509,752, filed on May 23, 2017.

(51) Int. Cl.
| | | |
|---|---|---|
| *B65D 79/02* | (2006.01) | |
| *G01L 5/00* | (2006.01) | |

(52) U.S. Cl.
CPC ............ *B65D 79/02* (2013.01); *G01L 5/0052* (2013.01)

(58) Field of Classification Search
CPC ...... B65D 79/00; B65D 79/005; B65D 79/02; G01L 5/00; G01L 5/0052; G01P 15/03; G01P 15/032; G01P 15/036; G01P 15/038; G01P 15/04; G01P 15/06; G01P 15/18
USPC .................................... 116/203, 215; 73/492
See application file for complete search history.

(56) References Cited

U.S. PATENT DOCUMENTS

| | | | | |
|---|---|---|---|---|
| 2,601,440 | A * | 6/1952 | Kerrigan ................ | B65D 79/02 116/203 |
| 4,177,751 | A * | 12/1979 | Rubey ..................... | G01P 15/04 116/201 |
| 4,685,578 | A * | 8/1987 | Dunshee .............. | B65D 55/026 206/807 |
| 6,367,408 | B1 * | 4/2002 | Gu ......................... | B65D 79/02 116/203 |
| 6,742,472 | B1 * | 6/2004 | Shigyo .................... | G01L 1/247 116/200 |
| 6,848,389 | B1 * | 2/2005 | Elsasser et al. ....... | G01L 5/0052 116/203 |
| 7,219,619 | B2 * | 5/2007 | Fitzer et al. .......... | G01P 15/036 116/203 |
| 9,329,094 | B2 * | 5/2016 | Noguchi ................ | G01L 5/0052 |
| 2009/0120834 | A1 * | 5/2009 | Ruman et al. ........ | B65D 77/003 206/745 |
| 2011/0144539 | A1 * | 6/2011 | Ouchi ..................... | A42B 3/046 600/587 |
| 2016/0161297 | A1 * | 6/2016 | Nakamura ............. | B65D 79/02 116/206 |

FOREIGN PATENT DOCUMENTS

| | | | | | |
|---|---|---|---|---|---|
| DE | | 3447833 A1 | * | 7/1986 | .............. A47L 13/17 |
| JP | | 2010085132 A | * | 4/2010 | .............. G01P 15/00 |
| WO | WO 2014152613 A1 | * | 9/2014 | .............. G01P 15/06 |

* cited by examiner

*Primary Examiner* — R. A. Smith

(57) ABSTRACT

Disclosed is a package handling system comprising: an indicator designed to display a mishandling indication upon application of a force in excess of a predetermined threshold force.

20 Claims, 4 Drawing Sheets

PACKAGE HANDLING SYSTEM

CROSS-REFERENCE TO RELATED APPLICATIONS

This application claims benefit to Provisional Application No. 62/485,293 filed May 23, 2017, which is incorporated herein by reference.

TECHNICAL FIELD

This disclosure is generally directed to a system to deter improper package handling.

BACKGROUND

Mishandling packages, especially during loading for transport, often results in merchandise damage. Such mishandling may include placing an over-heavy load on top of a package not designed to withstand that load, causing force/pressure which may damage or crush the merchandise in a package underneath. An example of this is when pallets, crates, boxes, or other cargo are stacked on top of other such or similar cargo (i.e. double stacked) by a freight, package delivery, or moving company. Often, this may be due to negligence and/or recklessness on the part of personelle handling the loading. As such, a system to encourage more careful handling is needed.

SUMMARY

Various inventive features are described below that can each be used independently of one another or in combination with other features.

In accordance with various embodiments, disclosed is a package handling system comprising: an indicator designed to display a mishandling indication upon application of a force in excess of a predetermined threshold force.

In accordance with further embodiments, disclosed is an indicator for a package handling system comprising: an indicator display; and a rupture component, wherein the indicator is configured to integrate with a package of the package handling system, wherein the indicator is configured to display an indication upon application of a force exceeding a predetermined threshold value applied to the indicator, and wherein said rupture component is configured to rupture upon application of said force exceeding said predetermined threshold value to effectuate said display of said indication. In some embodiments, the indicator further comprises an attachment member configured to affix the indicator to the package. In other embodiments, the package is preformed with the indicator. In yet further embodiments, the indication displayed by the indicator is effectuated by at least one of a physical, chromic, chemical, or electrical change by the indicator. In yet further embodiments, the rupture component is a chamber filled with liquid, gel, or a combination thereof. In yet further embodiments, the rupture component is a chamber filled with air. In yet further embodiments, the indicator comprises a chromic component. In yet further embodiments, the indication comprises a color change.

In accordance with further embodiments, disclosed is a package handling system comprising: an indicator configured to integrate with a package of the package handling system, wherein at least one additional package is stackable on top of a first package, said first package having said indicator integrated therewith, wherein said indicator is configured to provide an indication upon application of a force exceeding a predetermined threshold value to said indicator, and wherein said indication comprises at least one of a physical, chemical, chromic, or electrical change in the indicator. In some embodiments, the indicator comprises an adhesive backing. In other embodiments, the indicator comprises a rupture component configured to rupture upon application of said force exceeding said predetermined threshold value, said rupture component being a chamber filled with liquid, gel, or a combination thereof. In yet further embodiments, said indicator comprises a chromic component, a color component, or a combination thereof. In yet further embodiments, said indication is a visual indication comprising a color change.

In accordance with additional embodiments, disclosed is a package handling method comprising: integrating an indicator to a package, wherein said integrating comprises positioning said indicator on said package in a manner that allows said indicator to be impacted by a force to be applied to said package; and wherein said indicator is configured to display an indication in response to impaction by a force exceeding a predetermined threshold value, said indication being effectuated by at least one of a chromic, physical, chemical, or electrical change in said indicator. In some embodiments, the indicator comprises a rupture component configured to rupture upon application of said force exceeding said threshold value. In some embodiments, said rupture component comprises a chamber filled with liquid, gel, or a combination thereof. In yet further embodiments, said rupture component comprises a chamber filled with air. In yet further embodiments, said indication comprises a color change. In yet further embodiments, integrating said indicator to the package comprises adhesively attaching the indicator to the package. In yet further embodiments, the method further comprises stacking another package on said package having said indicator.

BRIEF DESCRIPTION OF THE FIGURES

The drawings described herein are for illustration purposes only and are not intended to limit the scope of the present disclosure in any way. The present disclosure will become more fully understood from the detailed description and the accompanying drawings wherein.

DETAILED DESCRIPTION

Figure 1:
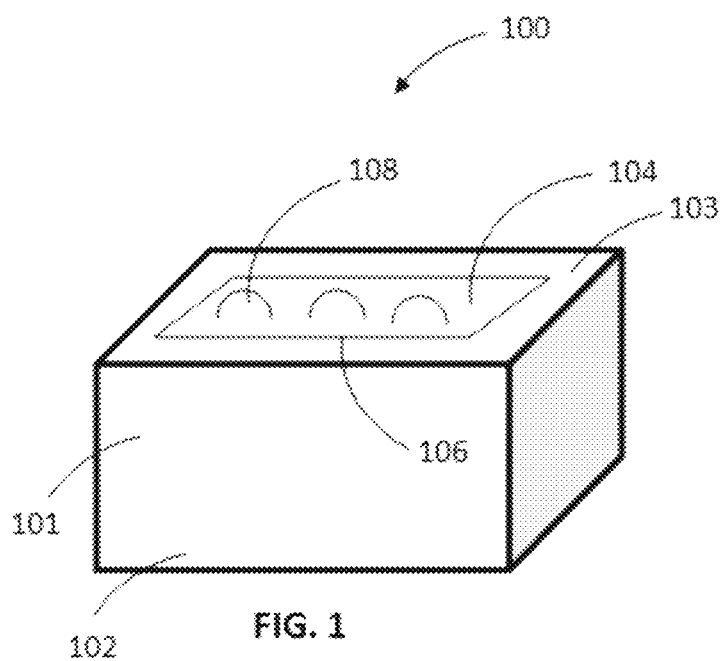
FIG. 1 illustrates a package handling system in accordance with various embodiments.

All ranges and ratio limits disclosed herein may be combined. Ranges disclosed herein include, unless specifically indicated, all endpoints and intermediate values.

Unless specifically stated otherwise, references to "a", "an", and/or "the" may include one or more than one and that reference to an item in the singular may also include the item in the plural. It is to be understood that the phrases "one or more" and "at least one" refer, for example, to instances in which one of the subsequently described circumstances occurs, and to instances in which more than one of the subsequently described circumstances occurs.

The term "optional" or "optionally" refer, for example, to instances in which subsequently described circumstances may or may not occur, and include instances in which the circumstance occurs and instances in which the circumstanced do not occur. The term "about" used in connection with a quantity is inclusive of the stated value and has the meaning dictated by the context (for example, it includes at least the degree of error associated with the measurement of the particular quantity). When used in the context of a range, the term "about" should also be considered as disclosing the range defined by the absolute values of the two endpoints. For example, the range "from about 2 to about 4" also discloses the range "from 2 to 4".

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Materials for attachment may include, but is not limited to adhesive material, nails, staples, tape, attachment processes such as ultrasonic welding, etc.

The term "package" refers to any merchandise item and/or container housing such item (e.g. box, envelope, etc.), and may be of any size, shape, or material. This term further includes any platform (such as a wooden, plastic, or metal pallet) onto which material is placed (where the material resident on the pallet is included as part of the "package" as well as excluded as part of the "package"). Additionally, where the merchandise is transported without any exterior container, housing, and/or platform, the term "package" may likewise reference the merchandise itself. Thus, various packages may include, but are not limited to pallets, crates, boxes, big bags (e.g. supersacks), the merchandise itself (without any exterior container, housing, and/or platform) and similar apparatuses used in the transportation of merchandise, freight, cargo, etc.

The term "pressure" generally refers to a force applied per unit area.

With reference to the accompanying figures, and in accordance with various embodiments, the present disclosure is generally directed to a package handling system 100 designed to indicate weather an excessive force has been applied to a package 102. According to various embodiments, the package handling system comprises an indicator 104 designed to display a mishandling indication upon application of a force in excess of a predetermined threshold ("excessive force"). The indicator may be integrated with a package, such that it is positioned to detect the application of force to the package, and provide an indication when the force has exceeded a threshold value. The indicator may be integrated with the package by removably or permanently attaching it to a surface (inner or outer) of the package or to an object inside the package. Additionally, integration of the indicator with a package may include, but is not limited to the following methods: attachment via an adhesive material or other attachment element (such as an adhesive backing, glue, tape, staples, nails, melting, stitching, welding etc.), constructing the indicator as an integrated part of the package (such as when the indicator is manufactured as part of or embedded within the structure of the package), etc. As exemplified in FIG. 2, the system may comprise an attachment member 106 (such as an adhesive backing), configured to affix the indicator to the package or to an object inside the package. In embodiments, a package itself (e.g. box, envelope, crate, etc.) may include the indicator, which is pre-attached and/or a constructed part of the package. Furthermore, in embodiments, the indicator may allow for other package(s) to be stacked on top of a package including an indicator in a manner that allows the other package(s) to lay relatively flat and substantially evenly supported on the surface of the package with the indicator. While placement of the indicator on a package may act as a deterrent to stacking another package(s) on top of the package with the indicator, it does not necessarily have to prohibit this. For example, since it is customary for multiple packages to be grouped together during shipment by a common carrier (such as Fedex®, UPS®, USPS®, freight carriers, etc.), it is may be advantageous that the indicator be configured in a manner which allows for other packages to be stacked on the package which includes the indicator. In such a case, what is important is not that another package(s) is stacked on top of the package with the indicator, but rather, that the force of the stacked package(s) does not exceed the predetermined threshold that can be applied to the package with the indicator. In this manner, allowing for other package(s) to be stacked on the package with the indicator would be acceptable so long as the force exerted by the other package(s) does not (by itself or cumulatively) exceed the predetermined threshold force on the package with the indicator.

In embodiments, the system 100 comprises affixing the indicator 104 to an outer surface 103 of the package 102. In alternate embodiments, the system 100 comprises affixing the indicator 104 to an inner surface, opposite outer surface 103 of the package. In additional alternate embodiments, the system 100 comprises affixing the indicator to one or more surfaces of package 102. In further alternate embodiments, the indicator may be affixed to an object in the package, and the object may be positioned such that the inner surface of the package is adjacent to the indicator, such that a force to the package will be transferred to the indicator.

In embodiments, the indication displayed by the indicator 104 may be caused by a physical change in the indicator. Various examples of a physical change which may be caused by an excessive force may include a color change effectuated by the mixing of 2 or more dyes, the breakage of at least one rupture chamber (that is filled with air, liquid, and/or gel), the breakage of a rigid material (such as plastic, wood, and/or metal), leaking of a fluid, etc., and various combinations thereof. Additional types of changes effectuating an indication may include a chemical, chromic, and/or electrical change in the indicator, effectuated by an excessive force. Thus, an indication may be effectuated by various changes due to an excessive force, which may include physical, chemical, chromic, and/or electrical, etc. changes in the indicator. In embodiments, the indication may be visual. A visual indication may include a color change and/or textual indication, which may be effectuated by mixing dyes, leakage of a dye, chromism, etc. Other types of visual indications may include a phosphorous and/or black light visible indication, the breakage of a rupture chamber, etc. It is noteworthy that an indication is not necessarily limited to a visual indication. For example, an indication may be auditory, olfactory, etc., according to various embodiments.

The indication component is configured to display an indication upon a specific pressure or force (threshold force) applied to the indicator. The threshold may be set based on the type of material, and by adjusting parameters such as material thickness, size, quality, shape, density, etc. The threshold value may be set according to desired parameters, for example, for very fragile packaging, a minimal threshold may be set, for example, at 0.5 lbs. In embodiments, the threshold force may be between about 1 lbs and 100 lbs to detect a moderate amount of force placed on the package. For example, the threshold value may be at about 1 lbs, or at about 5 lbs, or at about 25 lbs, or at about 50 lbs, or at about 75 lbs, or at about 100 lbs. In embodiments, the threshold value may be any value above 100 lbs to detect a large force placed on the package. For example, the threshold value may be at 200 lbs, at 500 lbs, at 800 lbs, at 1000 lbs, at 5000 lbs, or above, depending on the desired application. In embodiments, the user may be able to adjust the threshold, for example by using or layering multiple indicators or indicator sheets.

In embodiments, the indicator 104 may be in the form of a thin sheet made out of any suitable material, including, but not limited to plastic (such as polyethylene, polyurethane, etc), rubber film, paper, vinyl, etc. In embodiments, the indicator 104 may be made of a flexible material (singular such as a label and/or continuous such as a roll of material), and can be rollable or foldable for compact storage. It is noteworthy that a rollable or foldable material may include a single or multiple singular indicators that may be separated or detached from one another via any method of detachment including, but not limited to cutting, tearing, etc. In the case where a roll of material contains multiple singular separate indicators, such indicators may be distinguished from one another via a perforation in the roll of material. Similarly, each indicator can be made pre-cut with an adhesive backing and positioned side-by-side on a continuous non-adhesive film that allows each indicator to be peeled off the film when ready for affixation to a package (such as is typically done with a roll of adhesive backed labels). Alternatively, indicator 104 may be made out of a rigid material (including, but not limited to plastic, wood, metal, etc.) that can snap or break in response to application of excessive force beyond the predetermined threshold.

In embodiments, the indicator 104 may comprise a rupture component 108 configured to irreversibly collapse or rupture by the excessive force. In embodiments, the indication may alternatively comprise various layers of a chemical material that is sensitive to pressure and which changes color upon reaching a predetermined pressure threshold. In embodiments, the indication may be comprised of multiple layers of a dye material sandwiched together that form to reveal a distinctive color or text message when the excessive pressure threshold is reached.

In embodiments, rupture component 108 may be an air, liquid (non-gaseous), and/or gel filled chamber. In embodiments, the rupture component 108 may comprise a singular or a plurality of bubbles 109. The bubble(s) 108, 109 may be made of a pliable material, such as plastic, film, etc. The rupture component (bubble) 108 or bubble(s) 109 may be designed to rupture at a specific pressure or force (threshold force), based on the type of material, and by adjusting parameters such as material thickness, size, quality, shape, bubble density (i.e. number of bubbles per unit area), etc. The threshold value may be set according to desired parameters. For example, for very fragile packaging, a minimal threshold may be set, for example, at 0.5 lbs, to detect weather any object has been placed upon the package. In embodiments, the threshold force may be between about 1 lbs and 100 lbs. For example, the threshold value may be at about 1 lbs, or at about 5 lbs, or at about 25 lbs, or at about 50 lbs, or at about 75 lbs, or at about 100 lbs. In embodiments, the threshold value may be any value above 100 lbs, or above 1000 lbs, according to various embodiments. Rupture component 108, may undertake any geometric shape including, but not limited to circular, oval, square, triangular, etc, and may further undertake any 2 or 3 dimensional formation.

In embodiments, the rupture component 108 may comprise a liquid filled chamber which may include a coloring component or dye. In embodiments, the dye may be any color including luminescent or fluorescent, and/or black light visible. In embodiments, the rupture component may include two or more liquid filled chambers, which may be different colored dyes that combine to produce a third color (i.e. yellow and blue, which combine to make green, etc.)

Figure 2:
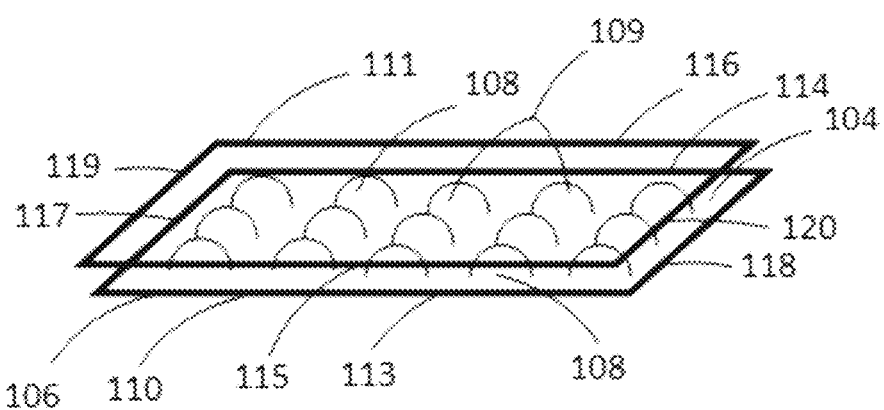
FIG. 2 illustrates an indicator, comprising a plurality of bubbles, in accordance with various embodiments.

In embodiments, and as particularly shown in FIG. 2, the rupture component may comprise a plurality of air filled bubbles 109 on a bottom sheet 110, such as the commonly known "Bubble wrap." The attachment member 106 may be an adhesive backing on a side of the bottom sheet 110 opposite the bubbles 109, as shown in FIG. 2. The adhesive backing may include a non-adhesive sheet, removable from the backing 110 to expose the adhesive surface. In embodiments, indicator 104 may further comprise a top layer sheet 111 that is placed on top of the bubbles 109 so as to "sandwich" them in between the top and bottom layer sheets 111, and 110. In this respect, top layer sheet 111 can provide a mechanism for containing the indication displayed by the indicator 104 such that the indication is prevented from coming in contact with package 102, any of its surfaces 103, or contents 101. The left 113 and right 114 sides of bottom layer sheet 110 and left 115 and right 116 sides of top layer sheet 111 can be sealed together (via, for example ultrasonic welding, heating/melting, gluing, or other method(s) applicable to the material used, and best known to those skilled in the art) so that indicator 104 comprises a side closed chamber that does not allow the indication to exit the confines of indicator 104 when bubbles 109 are breached. Additionally, and if required, front 117 and bottom back 118 ends of bottom layer sheet 110 can similarly be sealed to front 119 and back 120 ends of top layer sheet 111 in order to comprise a fully closed chamber. For example, in the case where the indication comprises a dye material encased in bubbles 109, and excessive force has caused the bubbles 109 to breach, the dye indicator that was encased in the bubbles 109 would spread outside the confines of the bubbles 109, yet remain within the confines of indicator 104 so as not to come in contact with the package 102 or any surface 103 of it. This would give a clear indication that excessive force has been placed on the package, while not allowing the indication component of indicator 104 to contaminate or affect any portion of package 102. In embodiments, package top layer sheet 111 may be transparent so that the indication can be easily seen through top layer sheet 111 when the excessive force threshold has been reached and when it has not.

Figure 3A:
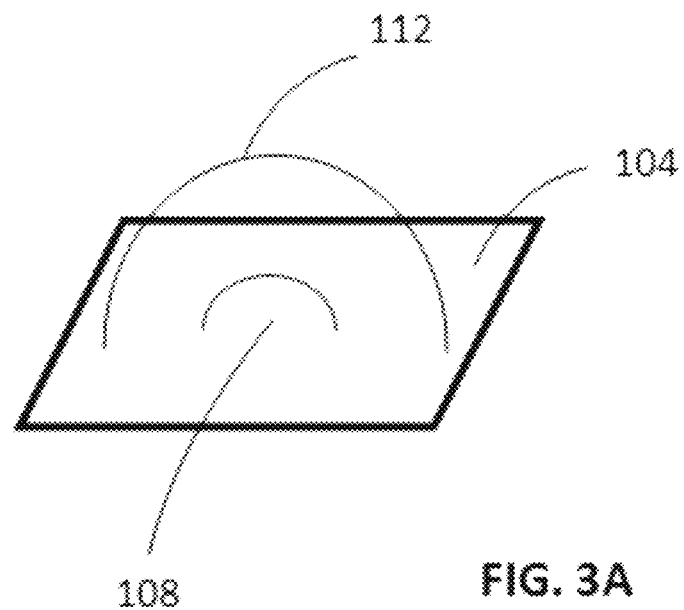
FIG. 3A illustrates an indicator comprising a secondary cover overlaying a single bubble, in accordance with various embodiments.
Figure 3B:
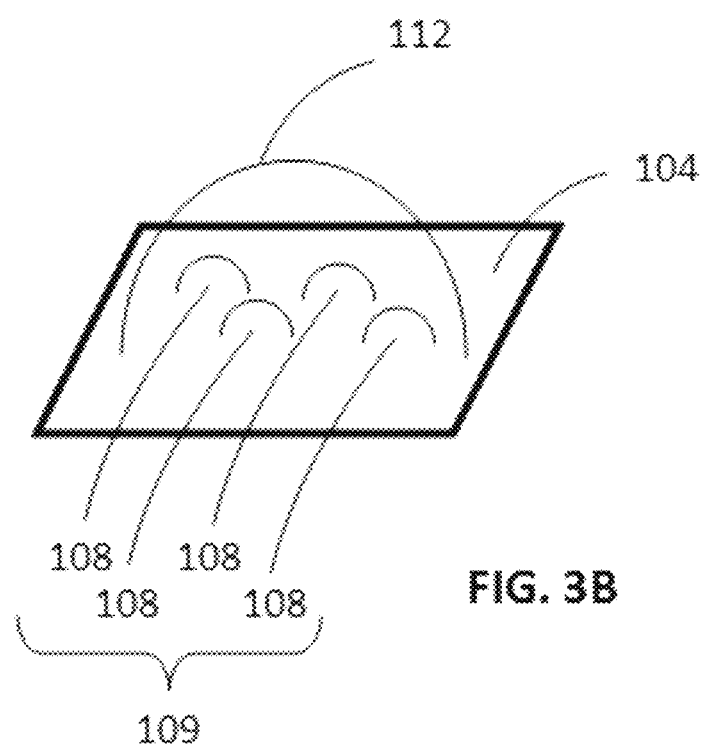
FIG. 3B illustrates an indicator comprising a secondary cover overlaying a plurality of bubbles, in accordance with various embodiments.

In embodiments, a liquid filled rupture component 108 may alternatively include a secondary bubble cover 112, which is rupture resistant or has a rupture threshold higher than that of rupture component 108, as shown in FIG. 3A, such that liquid is contained within the secondary cover 112, upon rupture of the rupture component 108. In embodiments, a plurality of bubbles 109 (rather than single 108) may similarly be contained within a single secondary cover 112, as shown in FIG. 3B.

In embodiments, the indicator 104 may comprise a chromic material (a material displaying chromism which is a process that induces a color change in a material, and can be effectuated by various external stimuli). In embodiments, the chromic material may display mechanochromism, tribochromism, piezochromism, and the like, as is or may become known with emerging technology. Such materials may display mechanoluminescence which is light emission resulting from any mechanical action on a solid. Other examples of mechanoluminescence may include fractoluminescence, which is caused by stress that results in the formation of fractures. Thus, materials that form fracture under the presence of stress such as weight are likewise contemplated for use with the indicator, according to various embodiments.

Through chromism, the indicator 104 can be tuned to indicate that a predetermined weight threshold has been exceeded on the package indicator. In embodiments, the chromic material displays irreversible chromism, reversiable chromism, or a combination thereof. In embodiments, the chromic material displays irreversible chromism upon application of a force/pressure above a threshold. In embodiments, the chromic material displays reversible chromism, or no chromism below the threshold.

In embodiments, the chromic material may be a dye, pigment, conjugated conducting polymer, oxide, organic molecule, etc. In embodiments, the chromic material may comprise a piezochromic polymer material. A piezochromic polymer material may include materials selected from pigments, dyes, paints, liquid crystals, microbial, etc., as is or may become known with emerging technology.

In embodiments, the indicator may include trademark, logo, particular dye color, or other source/ownership indication, such that it cannot be deceptively replaced by a third party. In embodiments, the indicator may include a "warning" or other message, such as "do not double-stack" or a weight tolerance limit.

Figure 4:
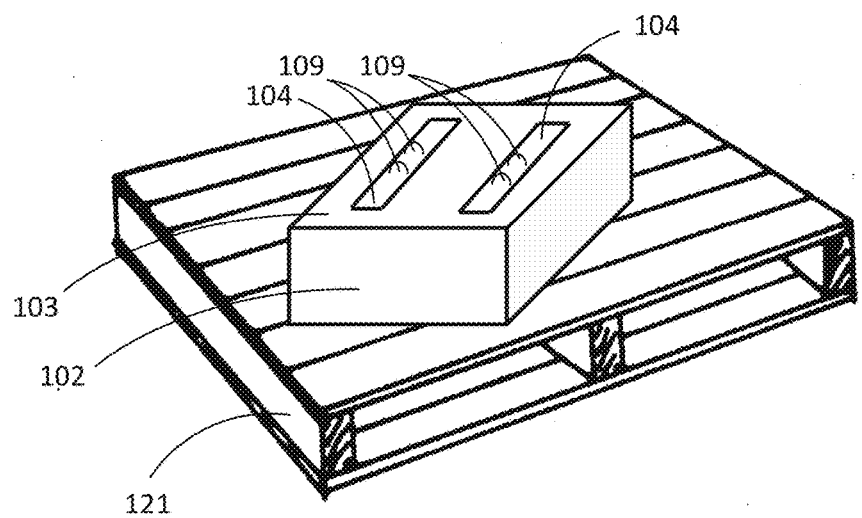
FIG. 4 illustrates a package laying on a pallet and having two indicators attached to its top surface, in accordance with various embodiments.

Indicator 104 may be of any size or shape, to cover any portion of the surface of the package 102, according to various embodiments. Additionally, any number of indicators may be placed on the package surface, according to various embodiments. For example, as shown in FIG. 4, two indicators 104 may be affixed to the top outer surface 103 of palletized package 102 (that is laying on pallet 121). If another pallet or any other packaged cargo is placed on top of package 102, where the weight of such pallet or cargo exceeds the predetermined threshold force of indicator(s) 104, the bubble 109 indication of indicator(s) 104 will rupture from their sealed compartment and allow the contained dye to leak out. This will provide a clear indication that excessive weight has been placed on top of package 102.

Figure 5A:
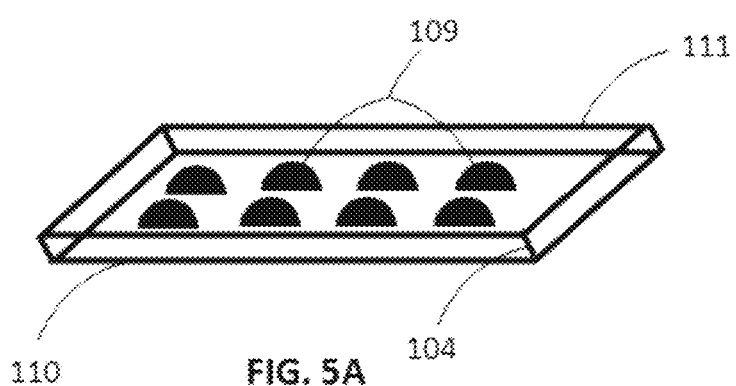
FIG. 5A illustrates an indicator, comprising a plurality of bubbles, prior to being ruptured by excessive weight, in accordance with various embodiments.
Figure 5B:
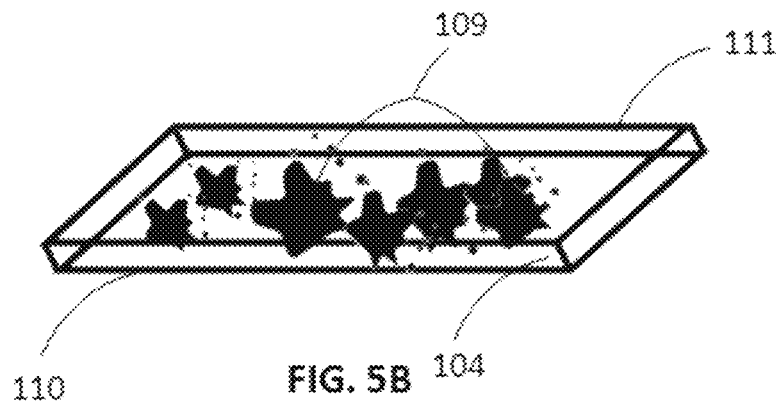
FIG. 5B illustrates an indicator, comprising a plurality of bubbles, after being ruptured by excessive weight, in accordance with various embodiments.

FIGS. 5A and 5B show embodiments of indicator 104 in a "before" and "after" state in order to illustrate functionality. In FIG. 5A, the indicator 104 is shown wherein the predetermined threshold force has not been reached, thereby allowing bubbles 109 to remain un-breached and contain the indication material (e.g. dye, in this embodiment) within. Conversely, FIG. 5B illustrates indicator 104 wherein the predetermined threshold force has been reached and bubbles 109 have been breached due to excessive weight being placed on the indicator 104. The result is that the bubbles 109 have ruptured, thereby allowing the indication material (e.g. dye, in this embodiment) to spill in between the surface area of bottom sheet 110 and top sheet 111. In embodiments where the left, right, front, and back sides of the bottom sheet 110 and top sheet 111 are sealed together, the spilled indication material between bottom sheet 110 and top sheet 111 is fully contained inside the confines of indicator 104. The spilled dye thereby provides a clear indication that excessive weight/force has been placed on indicator 104.

In embodiments the bottom sheet 110 may comprise an absorbent material in order to prevent any dye or other indicating material from escaping the confines of the indicator and coming in contact with the package. Such absorbent material may include, but is not limited to the following: fiber based material (such as, paper, cellulose, rayon, cotton, fluf pulp, bamboo viscose, polyester, lycra, wool, hemp), sponge, superabsorbant polymers (SAPs) (such as sodium polyacrylate, polyacrylamide copolymer, ethylene maleic anhydride copolymer, polyvinyl alcohol copolymers, carboxy methylcellulose, polyacrylonitrile), Hydrogels, etc.

Figure 6:
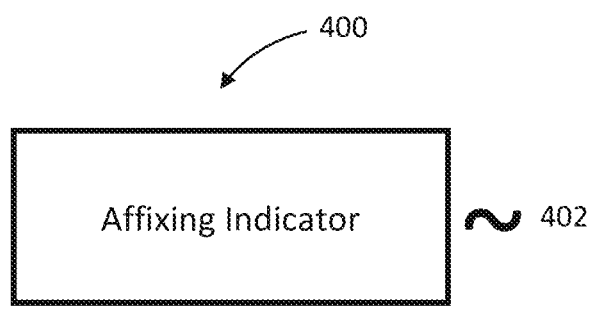
FIG. 6 shows a package handling method, in accordance with various embodiments.

FIG. 6 shows a package handling method 400, in accordance with various embodiments, which comprises integrating an indicator to a package, such that the indicator is positioned to detect the application of force to the package (step 402). In embodiments, step 402 may comprise affixing the indicator to an outer and/or inner surface of the package. In embodiments, the indicator may be affixed to the surface via an adhesive. For example, the indicator may be adhesively affixed to an outer surface of the package, according to various embodiments. In embodiments, the package may be preformed with the indicator as a component of the package. For example, the package may be preformed with the indicator integrated into its outer and/or inner surface, according to various embodiments. In alternate embodiments, integrating the indicator to the package may comprise coupling (e.g. affixing) the indicator to an object encased in the package, rather than to the package itself, wherein the indicator is positioned to detect the application of a force to the package. Thus, according to the method, the package including the indicator may be handed to a third party, such as a package delivery company (e.g. FedEx®, UPS®), freight company (e.g. YRC® Freight Lines, Old Dominion® Freight Lines, ABF® Freight Lines, Fedex® Freight Lines, etc.), a moving company, etc. Thus, based on the presence or absence of a mishandling indication by the indicator, one will be able to determine whether the package has been subject to an excessive force.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more". Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for". As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

It will be appreciated that variations of the above-disclosed and other features and functions, or alternatives thereof, may be desirably combined into many other different systems or applications. Also that various, presently unforeseen or unanticipated, alternatives, modifications, variations or improvements therein may be subsequently made by those skilled in the art which are also intended to be encompassed by the following claims.

What is claimed is:

1. An indicator for a package handling system comprising:
    an indicator display; and
    a rupture component,
    wherein the indicator is configured to integrate with a first package of the package handling system,
    wherein the indicator is configured to display an indication upon application of a stacked weight force exceeding a predetermined threshold value applied to the indicator, and wherein
    said rupture component is configured to rupture upon application of said force exceeding said predetermined threshold value to effectuate said display of said indication, wherein said package handling system comprises stackable packages, wherein the indicator is configured to allow for at least one other package to be stacked on top of said first package with the indicator in a manner that allows said at least one other package to lay relatively flat and substantially evenly supported on the surface of the package with the indicator.

2. The indicator of claim 1, further comprising an attachment member configured to affix the indicator to the package.

3. The indicator of claim 1, wherein the package is preformed with the indicator.

4. The indicator of claim 1, wherein the indication displayed by the indicator is effectuated by at least one of a physical, chromic, chemical, or electrical change by the indicator.

5. The indicator of claim 1, wherein the rupture component is a chamber filled with liquid, gel, or a combination thereof.

6. The indicator of claim 1, wherein the rupture component is a chamber filled with air.

7. The indicator of claim 1, wherein the indicator comprises a chromic component.

8. The indicator of claim 1, wherein the indication comprises a color change.

9. A package handling system comprising: determining whether a cumulative weight force exceeding a predetermined threshold value has been loaded upon a first package of the package handling system by using an indicator configured to integrate with said first package,
    wherein at least one additional package is stackable on top of said first package when said first package has said indicator integrated therewith,
    wherein said indicator is configured to provide an indication upon application of a loaded weight force exceeding the predetermined threshold value to said indicator, and wherein
    said indication comprises at least one of a physical, chemical, chromic, or electrical change in the indicator.

10. The system of claim 9, wherein said indicator comprises an adhesive backing.

11. The system of claim 9, wherein said indicator comprises a rupture component configured to rupture upon application of said force exceeding said predetermined threshold value, said rupture component being a chamber filled with liquid, gel, or a combination thereof.

12. The system of claim 9, wherein said indicator comprises a chromic component, a color component, or a combination thereof.

13. The system of claim 9, wherein said indication is a visual indication comprising a color change.

14. A package handling method comprising:
    integrating an indicator to a package, wherein said integrating comprises positioning said indicator on said package in a manner that allows said indicator to react to a load applied to said package,
    wherein said indicator is configured to display an indication in response to loading of a weight force exceeding a predetermined threshold value, said indication being effectuated by at least one of a chromic, physical, chemical, or electrical change in said indicator; and
    determining whether at least one other package having a cumulative weight force exceeding said predetermined threshold value has been stacked upon said package with the indicator.

15. The method of claim 14, wherein the indicator comprises a rupture component configured to rupture upon application of said force exceeding said threshold value.

16. The method of claim 15 wherein said rupture component comprises a chamber filled with liquid, gel, or a combination thereof.

17. The method of claim 15 wherein said rupture component comprises a chamber filled with air.

18. The method of claim 14, wherein said indication comprises a color change.

19. The method of claim 14, wherein integrating said indicator to the package comprises adhesively attaching the indicator to the package.

20. The method of claim 14, wherein said predetermined threshold value is about 0.5 lbs, about 1 lbs, about 5 lbs, about 25 lbs, about 50 lbs, about 75 lbs, about 100 lbs, or above 100 lbs.

* * * * *